(12) United States Patent
Kim et al.

(10) Patent No.: US 8,041,144 B2
(45) Date of Patent: Oct. 18, 2011

(54) APPARATUS AND METHOD FOR IMPROVING VISIBILITY OF AN IMAGE IN A HIGH ILLUMINANCE ENVIRONMENT

(75) Inventors: In-Ji Kim, Yongin-si (KR); Hyun-wook Ok, Seoul (KR); Du-sik Park, Suwon-si (KR); Yang-ho Cho, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1036 days.

(21) Appl. No.: 11/873,042

(22) Filed: Oct. 16, 2007

(65) Prior Publication Data

US 2008/0181532 A1    Jul. 31, 2008

(30) Foreign Application Priority Data

Oct. 17, 2006  (KR) .................. 10-2006-0100953

(51) Int. Cl.
*G06K 9/40*    (2006.01)
(52) U.S. Cl. ........ 382/274; 382/254; 382/260; 382/167; 345/204; 345/207; 345/690; 345/697; 348/602; 348/603
(58) Field of Classification Search .................. None
See application file for complete search history.

(56) References Cited

U.S. PATENT DOCUMENTS

| | | | |
|---|---|---|---|
| 6,611,296 B1 * | 8/2003 | Nieuwenhuizen et al. ... | 348/625 |
| 7,515,160 B2 * | 4/2009 | Kerofsky ..................... | 345/600 |
| 7,545,397 B2 * | 6/2009 | O'Dea et al. ................. | 345/694 |
| 2001/0046320 A1 * | 11/2001 | Nenonen et al. ............. | 382/169 |
| 2005/0212824 A1 * | 9/2005 | Marcinkiewicz et al. .... | 345/690 |
| 2006/0187242 A1 * | 8/2006 | Lee et al. ..................... | 345/690 |
| 2007/0109447 A1 * | 5/2007 | Yamashita et al. ........... | 348/602 |
| 2007/0285382 A1 * | 12/2007 | Feng ............................ | 345/102 |
| 2008/0316349 A1 * | 12/2008 | Toyoda ................... | 348/333.01 |

FOREIGN PATENT DOCUMENTS

| | | |
|---|---|---|
| EP | 1075140 | 2/2001 |
| EP | 1667065 | 6/2006 |
| GB | 2357649 | 6/2001 |
| JP | 9-9157 | 1/1997 |
| KR | 1997-31998 | 6/1997 |

(Continued)

OTHER PUBLICATIONS

Office Action issued in corresponding European Patent Application No. 07118188.7 dated Mar. 26, 2008.

(Continued)

*Primary Examiner* — Sath V Perungavoor
*Assistant Examiner* — Jason Heidemann
(74) *Attorney, Agent, or Firm* — Staas & Halsey LLP

(57) ABSTRACT

An apparatus and method for improving visibility of an image. The apparatus includes: a lookup table (LUT) generating module generating an LUT having image data in a high illuminance environment corresponding to image data of an input image set therein so as to increase lightness and chroma of the input image according to external illuminance; an image mapping module mapping the image data of the input image into the image data in the high illuminance environment on the basis of the generated LUT; and a local contrast increasing module increasing local contrast of the mapped image data using a parameter for adjusting the local contrast according to the external illuminance.

16 Claims, 10 Drawing Sheets
(2 of 10 Drawing Sheet(s) Filed in Color)

FOREIGN PATENT DOCUMENTS

KR  1999-13191  2/1999
WO  WO 00/52938  9/2000

OTHER PUBLICATIONS

Kim et al., "Illuminant Adaptive Color Reproduction Based on Lightness Adaptation and Flare for Mobile Phone", Image Processing, 2006 IEEE International Conference on IEEE, PI, Oct. 2006, pp. 1513-1516.

English Abstract for Korean Publication No. 100208986.

"The Course of Foveal Light Adaptation Measured by the Threshold Intensity Increment," Howard DeHaven Baker, Journal of the Optical Society of America, vol. 39, Issue 2, pp. 172-179 (1949).

* cited by examiner

APPARATUS AND METHOD FOR IMPROVING VISIBILITY OF AN IMAGE IN A HIGH ILLUMINANCE ENVIRONMENT

CROSS-REFERENCE TO RELATED APPLICATION

This application claims the benefit of Korean Application No. 2006-100953, filed on Oct. 17, 2006 in the Korean Intellectual Property Office, the disclosure of which is incorporated herein by reference.

BACKGROUND OF THE INVENTION

1. Field of the Invention

Aspects of the present invention relate to an apparatus and method for improving the visibility of an image, and more particularly, to an apparatus and method for improving the visibility of an image when an apparatus, such as a digital camera, a camera phone, or a camcorder, provides images in a high illuminance environment.

2. Description of the Related Art

In general, personal portable terminals, such as cellular phones and PDAs having "portability" and "mobility", allow users to view contents on a display screen in any kind of environment.

However, since an image displayed on a display screen of a personal portable terminal can be affected by the environment, such as illuminance and color temperature, the same image may look different according to the environment. Specifically, when the illuminance surrounding the display screen is more than the illuminance of the display screen, for example, outside during a sunny day, the visibility of the image displayed on the display screen is drastically reduced.

The reduction in the visibility may be one of the factors that diminish various merits of the personal portable terminal.

Therefore, the visibility of the image displayed on the display screen needs to be maintained even if the environment changes, and particularly, it is necessary to prevent the visibility of the image from being reduced due to a high illuminance environment.

SUMMARY OF THE INVENTION

An aspect of the present invention is to provide an apparatus and method for ensuring visibility of an image in a high-illuminance environment and improving a local contrast characteristic by performing image mapping using a lookup table (LUT) in one physical display apparatus.

Aspects of the present invention are not limited to those mentioned above, and other objects of the present invention will be apparently understood by those skilled in the art through the following description.

According to an aspect of the present invention, there is provided an apparatus for improving visibility of an image, the apparatus including: an LUT generating module generating an LUT having image data in a high illuminance environment corresponding to image data of an input image set therein so as to increase lightness and chroma of the input image according to external illuminance; an image mapping module mapping the image data of the input image into the image data in the high illuminance environment on the basis of the generated LUT; and a local contrast increasing module increasing local contrast of the mapped image data using a parameter for adjusting the local contrast according to the external illuminance.

According to another aspect of the present invention, there is provided a method of improving visibility of an image, the method including: generating an LUT having image data in a high illuminance environment corresponding to image data of an input image set therein so as to increase lightness and chroma of the input image according to external illuminance; mapping the image data of the input image into the image data in the high illuminance environment on the basis of the generated LUT; and increasing local contrast of the mapped image data using a parameter for adjusting the local contrast according to the external illuminance.

Additional aspects and/or advantages of the invention will be set forth in part in the description which follows and, in part, will be obvious from the description, or may be learned by practice of the invention.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee. These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
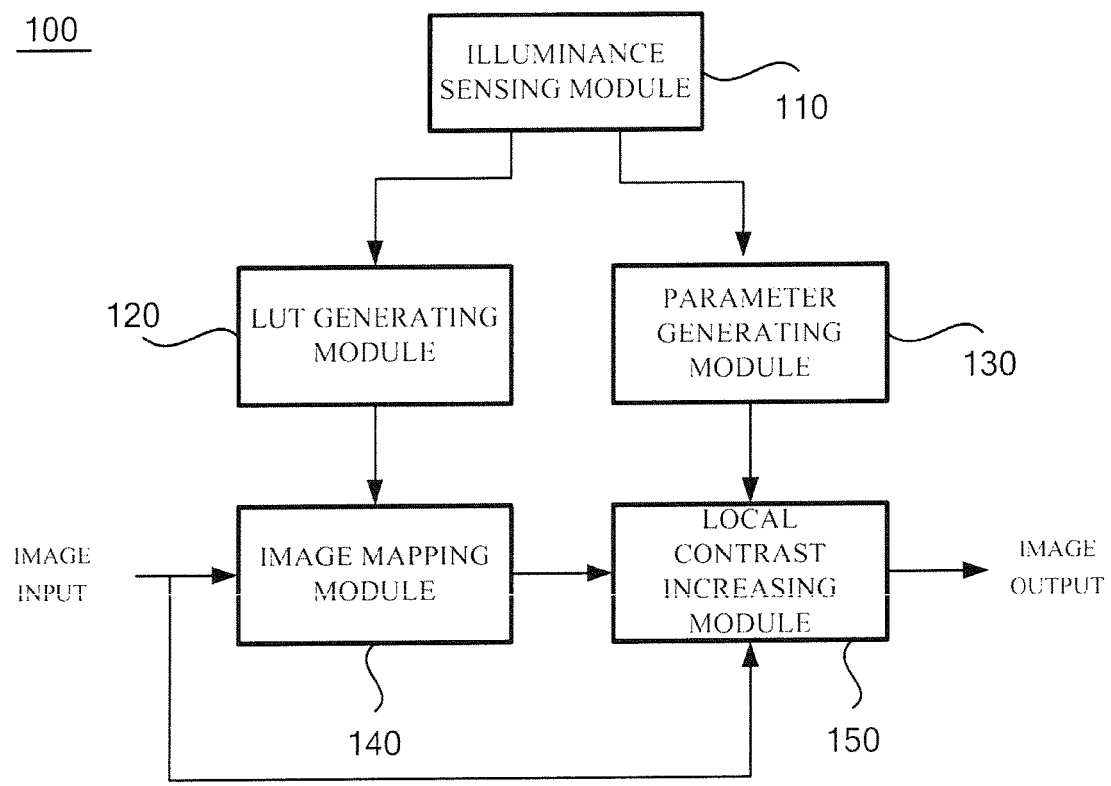
FIG. 1 is a block diagram illustrating the structure of an apparatus for improving visibility of an image according to an embodiment of the invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Aspects of the present invention are described hereinafter with reference to block illustrations or flowchart illustrations of an apparatus and method for improving the visibility of an image in a high illuminance environment according to embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory or medium that can direct a computer or other programmable data processing apparatus to function in a particular manner, such that the instructions stored in the computer usable or computer-readable memory produce an article of manufacture including instruction means that implement the function specified in the flowchart block or blocks. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Meanwhile, the term "high illuminance environment" used in the following specification means an environment in which a user can scarcely recognize the image displayed on the display screen due to the high illuminance in the surrounding of the portable terminal or the user recognizes that image distortion (for example, variation in hue, brightness, or chroma) has occurred due to the surrounding high illuminance. Therefore, the high illuminance environment can be understood to mean an environment in which visibility of an image is reduced, rather than an environment in which the illuminance is higher than a specific value.

FIG. 1 is a block diagram illustrating the structure of an apparatus for improving the visibility of an image according to an embodiment of the invention.

Referring to FIG. 1, an apparatus 100 according an embodiment of the invention includes an illuminance sensing module 110, an LUT generating module 120, a parameter generating module 130, an image mapping module 140, and a local contrast increasing module 150.

The illuminance sensing module 110 includes an illuminance sensor sensing outside illuminance of the apparatus 100 and supplies sensed illuminance information to the LUT generating module 120 and the parameter generating module 130.

The LUT generating module 120 generates a lookup table (LUT) for gamut mapping on the basis of the illuminance information.

The parameter generating module 130 generates a parameter used for adjusting local contrast on the basis of the illuminance information.

The image mapping module 140 maps image data of an input image into image data in a high illuminance environment using the LUT generated by the LUT generating module 120.

The local contrast increasing module 150 increases the local contrast of the input image using the parameter provided by the parameter generating module 130, the input image, and the image mapped by the image mapping module 140.

The image whose local contrast has been increased by the local contrast increasing module 150 may be provided to a user through a display screen (not shown).

The term "module", as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Figure 2:
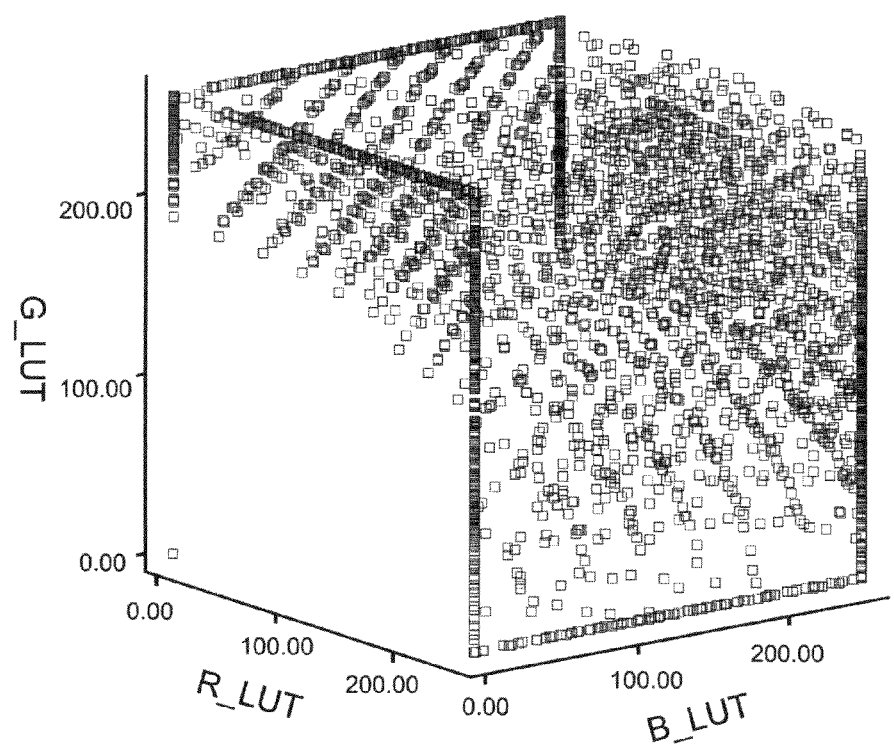
FIG. 2 is a view illustrating a lookup table (LUT) according to another embodiment of the invention.

In this embodiment, the LUT generating module 120 can generate an RGB LUT (Lookup Table) on the basis of the illuminance information provided by the illuminance sensing module 110, as illustrated in FIG. 2. The RGB LUT has a feature that can improve the overall luminance while improving the lightness value of a black color, and improve the chroma. The lightness and chroma characteristics of the RGB LUT are illustrated in FIGS. 3 and 4.

Figure 3:
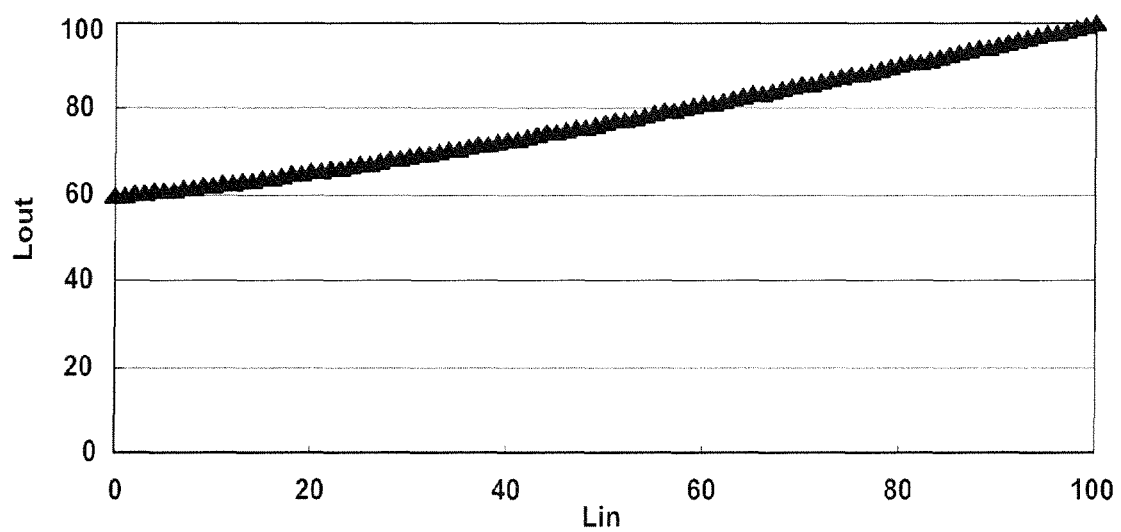
FIG. 3 is a view illustrating a graph used for increasing lightness according to an embodiment of the invention.
Figure 4:
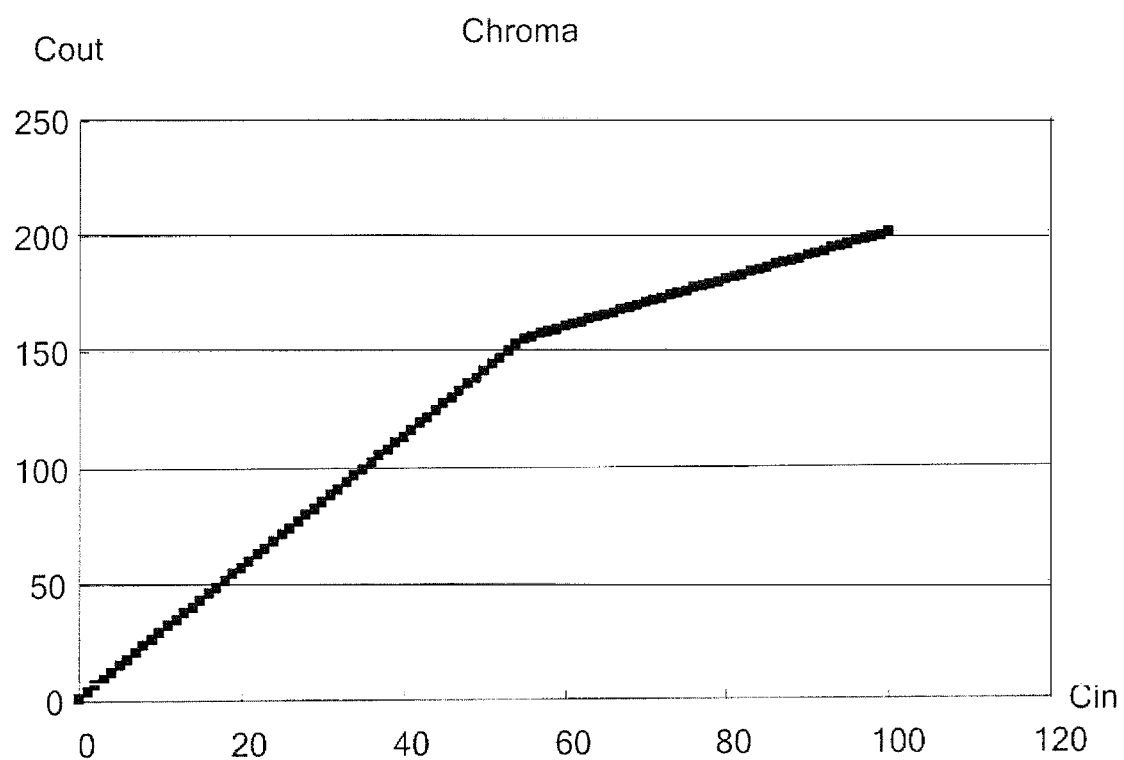
FIG. 4 is a view illustrating a graph used for increasing chroma according to an embodiment of the invention.

FIG. 3 is a view illustrating a graph used for increasing lightness according to an embodiment of the invention, and FIG. 4 is a view illustrating a graph used for increasing chroma according to an embodiment of the invention.

In FIG. 3, a horizontal axis and a vertical axis each represent lightness from 0 (black color) to 100 (white color). Referring to FIG. 3, for example, when the lightness data on an arbitrary pixel in an LCH (lightness, chroma, hue) color space is 0, the lightness data on the corresponding pixel is increased to 60. A light increase characteristic according to the invention has a feature in which, as lightness data on an arbitrary pixel in the LCH color space increases from 0, light data on the vertical axis gradually increases from 60. In this embodiment, when the lightness data on the arbitrary pixel in the LCH color space is 0, the increased lightness data Lout on the corresponding pixel is 60. However, the invention is not limited thereto. As long as Lout can ensure visibility, any Lout within the scope of the invention can be used.

Also, referring FIG. 4, a horizontal axis representing a chromatic value of an arbitrary pixel is scaled from 0 to 100, and a vertical axis represents an increased chromatic value of the corresponding pixel.

In FIG. 4, the amount of increase that is capable of ensuring the visibility of the image can be obtained by an experiment. Not only the graph illustrated in FIG. 4 but also any graph capable of ensuring the visibility of the image by increasing the chroma can be applied to the invention for increasing the chroma.

Meanwhile, when the lightness and the chroma are increased, generally, the bluish hue is changed. For this reason, the LUT generating module 120 can generate an LUT capable of correcting the bluish hue.

Figure 5:
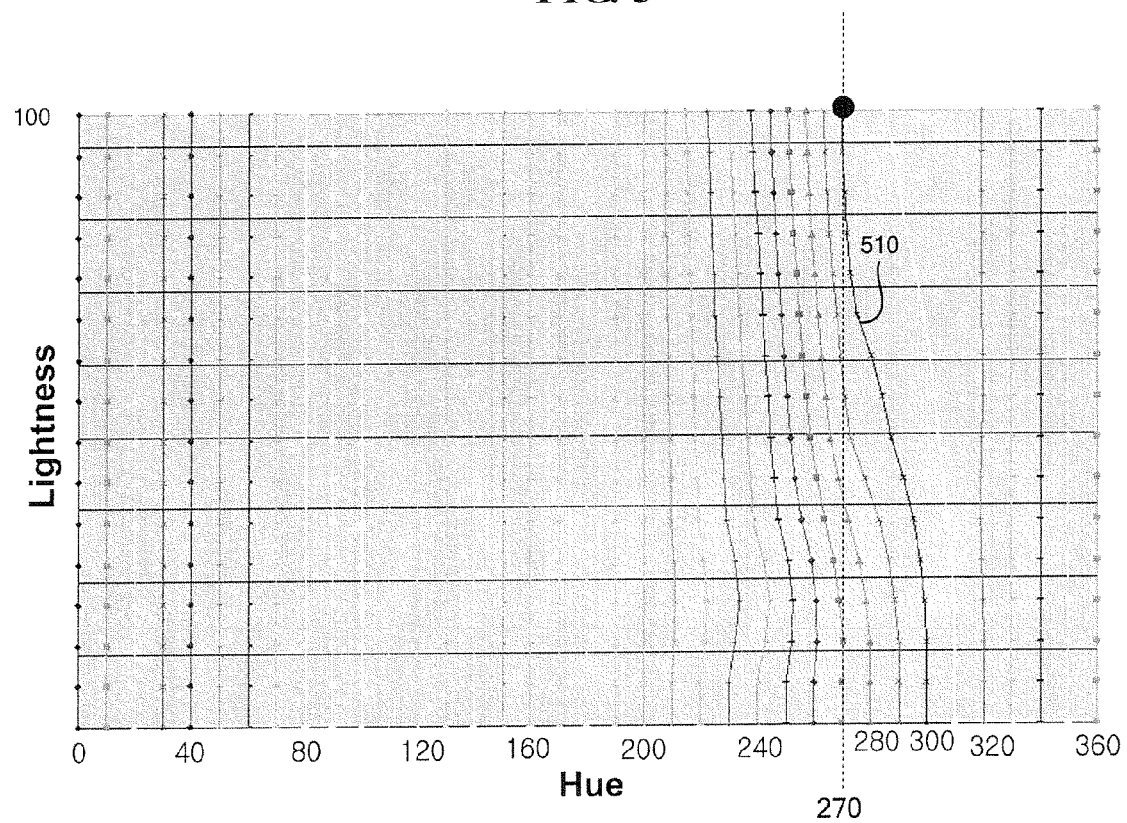
FIG. 5 is a view illustrating a graph used for hue correction according to an embodiment of the invention.

A hue correcting method uses a graph illustrated in FIG. 5. In FIG. 5, the bluish hue exists between 200 and 320 in a horizontal axis representing a hue value, and lightness data represented by a vertical axis is scaled from 0 to 100.

For example, referring to a graphic curve 510 corresponding to a hue value of 300, it can be seen that, when lightness data is 100, the graphic curve 510 corresponds to a hue value of about 270. That is, even though the lightness of pixel data corresponding to the hue value of 300 is increased by correcting the hue value to 270, the user cannot visually notice that the bluish hue has deteriorated. Referring to the graph illustrated in FIG. 5, it can be seen that, as the lightness increases, the hue value of the bluish hue decreases.

Figure 6:
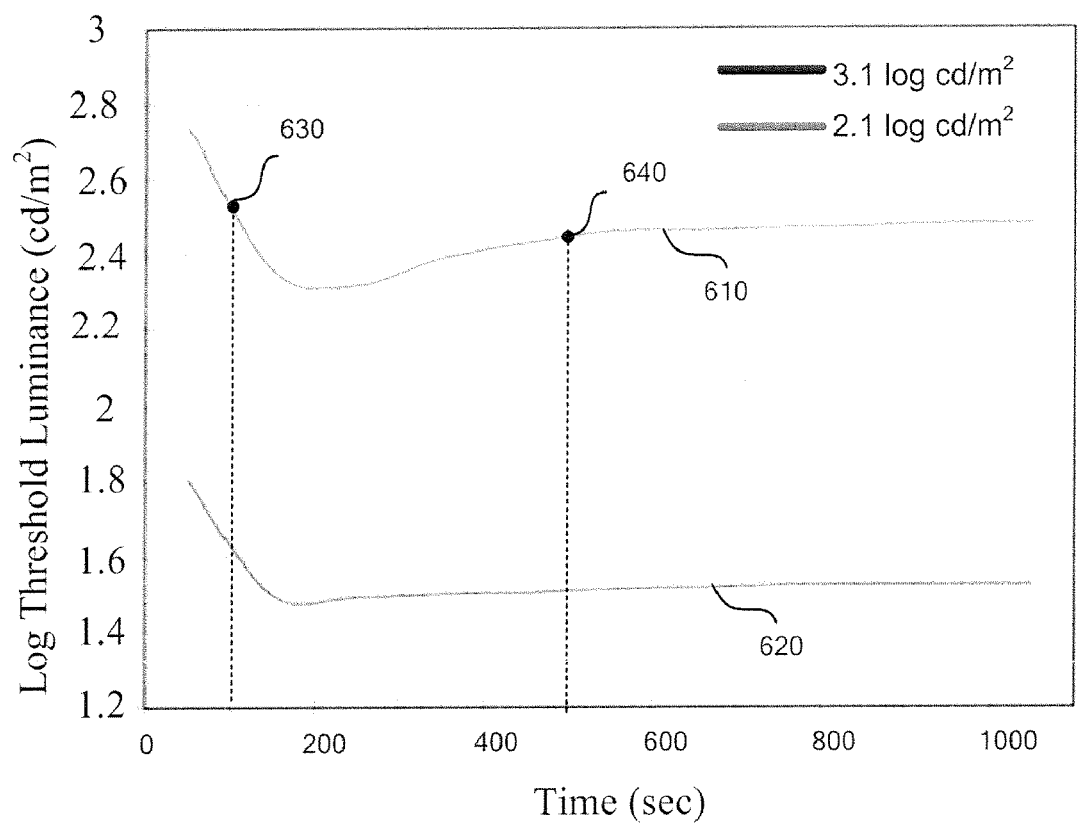
FIG. 6 is a graph illustrating lightness the amount of time for the human eyes to perceive lightness under an external environment.

Meanwhile, the parameter generating module 130 determines a parameter value for adjusting the local contrast reflecting a graph illustrating lightness perceived by the human eyes over time under an external environment condition as shown in FIG. 6.

When a user moves from a dark place to a light place, generally, a predetermined amount of time is necessary for the user's eyes to adjust so as to perceive a predetermined lightness. FIG. 6 shows lightness perceived by the human eyes over time under an external environment condition. In FIG. 6, two graphs 610 and 620 show brightness when perceived by the human eyes under different illuminances.

The parameter generating module 130 calculates the duration of the illuminance sensed by the illuminance sensing module 110. For example, in FIG. 6, in the case when the upper graph 610 represents an illuminance of 40000 luxes, if the duration of the illuminance of 40000 luxes is calculated to 100 seconds, the parameter value is determined according to lightness data 630 corresponding to the duration of 100 seconds. If the duration of the illuminance of 40000 luxes is calculated to 500 seconds, the parameter value is determined according to lightness data 640 corresponding to the duration of 500 seconds. In this case, the parameter generating module 130 may previously store the duration of a predetermined illuminance and the parameter value corresponding to the duration of the predetermined illuminance or the parameter value may be experimentally obtained to optimize local contrast compensation.

Meanwhile, the same graph as shown in FIG. 6 is disclosed in Journal of the Optical Society of America, 39, 172-179.

The image mapping module 140 maps the image data of the input image into image data in the high illuminance environment by using the LUT generated by the LUT generating module 120. If image data corresponding to the RGB image data of an arbitrary pixel of the input image is not set in the generated LUT, the image data of the corresponding pixel can be constructed by interpolation using the image data corresponding to the RGB image data of adjacent pixels to perform the mapping. In this case, the interpolation may be performed by a conventional interpolation method.

The local contrast increasing module 150 increases the local contrast using the parameter W supplied by the parameter generating module 130, the image data of the input image, and the image data of the image into which the input image has been mapped by the image mapping module 140.

Figure 7:
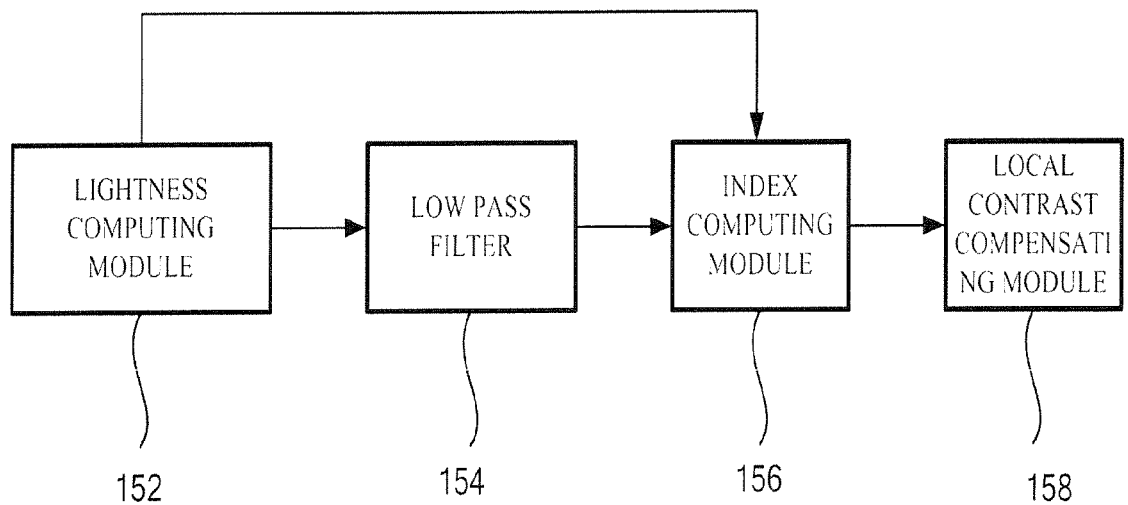
FIG. 7 is a view illustrating the structure of a local contrast increasing module.
Figure 8:
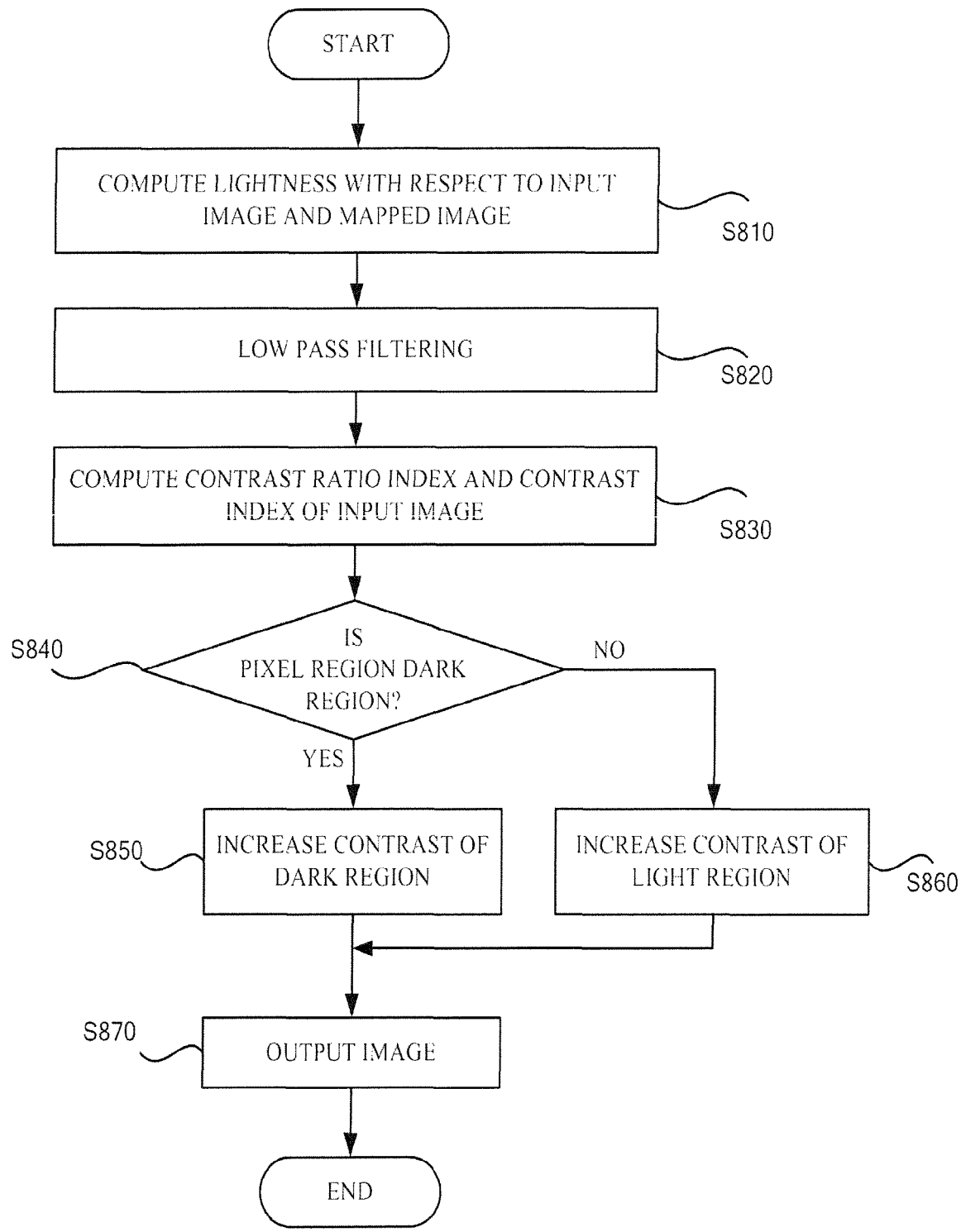
FIG. 8 is a flow chart illustrating a method of increasing local contrast according to an embodiment of the invention.

FIG. 7 illustrates the components of the local contrast increasing module 150, and FIG. 8 illustrates the local contrast increasing operation of the local contrast increasing module 150. A method of increasing local contrast according to an embodiment of the invention will be described in detail with reference to FIGS. 7 and 8.

Referring to FIG. 7, the local contrast increasing module 150 includes a lightness computing module 152, a low pass filter 154, an index computing module 156, and a local contrast compensating module 158.

The lightness computing module 152 computes the lightness of the input image and the lightness of the image into which the input image has been mapped by the image mapping module 140 (operation S810). In order to distinguish the lightness of the input image from the lightness of the image into which the input image has been mapped by the image mapping module 140, the luminance of each of the pixels constituting the input image is denoted by "Y_pixel", the average value of the luminances of all pixels constituting the input image is denoted by "Y_mean", and the luminance of each of the pixels constituting the image into which the input image has been mapped is denoted by "Y'_pixel".

The low pass filter 154 filters the Y_pixel and the Y'_pixel (operation S820). The filtered Y_pixel and Y'_pixel are denoted by "Y_pixel_filtered" and "Y'_pixel_filtered", respectively.

Then, the index computing module 156 computes a contrast ratio index and a contrast index with respect to the input image (operation S830).

The contrast index and the contrast ratio index can be defined by the following Expressions 1 and 2, respectively:

$$\text{contrast\_index} = \frac{Y\_mean - Y\_pixel}{Y\_mean + Y\_pixel}, \text{ and} \quad \text{[Expression 1]}$$

$$\text{contrast\_ratio\_index} = \frac{Y\_pixel\_fitered}{Y\_pixel} \quad \text{[Expression 2]}$$
$$= \frac{Y'\_pixel\_filtered}{Y'\_pixel}.$$

The local contrast compensating module 158 compensates the local contrast using the index data obtained by Expressions 1 and 2.

First, the local contrast compensating module 158 determines whether a pixel region of the input image is a dark region or a light region using the contrast_index with respect to the input image (operation S840). If the value of the contrast_index is equal to or more than a predetermined threshold, the corresponding pixel region is determined as a dark region, and if not, the corresponding pixel region is determined as a light region.

When it is determined that the pixel region is a dark region, the contrast of the dark region is increased (operation S850). In this case, the local contrast compensating module 158 adjusts the amount of increase using the parameter W. For example, when the parameter W is a value representing an increase ratio and the input image is an RGB image, R, G, and B values of the image whose local contrast has been compensated can be expressed by the following Expression 3, in which R', G', and B' represent image data whose local contrast has been compensated:

$$R' = R - W*R,$$

$$G' = G - W*G, \text{ and}$$

$$B' = B - W*B. \quad \text{[Expression 3]}$$

Meanwhile, when it is determined in operation S840 that the pixel region is a light region, the contrast of the light region is increased (operation S860). In this case, the local contrast compensating module 158 determines whether to increase or maintain the contrast of the corresponding pixel region by comparing the contrast_ratio_index to the predetermined threshold.

If it is determined that the contrast of a pixel corresponding to the pixel region needs to be increased, the local contrast compensating module 158 increases the contrast of the corresponding pixel using the contrast value of the input image and the parameter. For example, when the parameter W is a value representing an increase ratio and the input image is an RGB image, the R, G, and B values of the pixel whose contrast will be increased can be expressed by the following Expression 4, in which R', G', and B' represent image data whose local contrast has been increased:

$$R'=R+W*R*\text{contrast\_ratio\_index},$$

$$G'=G+W*G*\text{contrast\_ratio\_index, and}$$

$$B'=B+W*B*\text{contrast\_ratio\_index}. \quad \text{[Expression 4]}$$

After increasing the contrast of the dark region or the light region, the local contrast compensating module 158 outputs the compensated image on a display screen (not shown) such that the user can see the compensated image (operation S870).

Figure 9A:
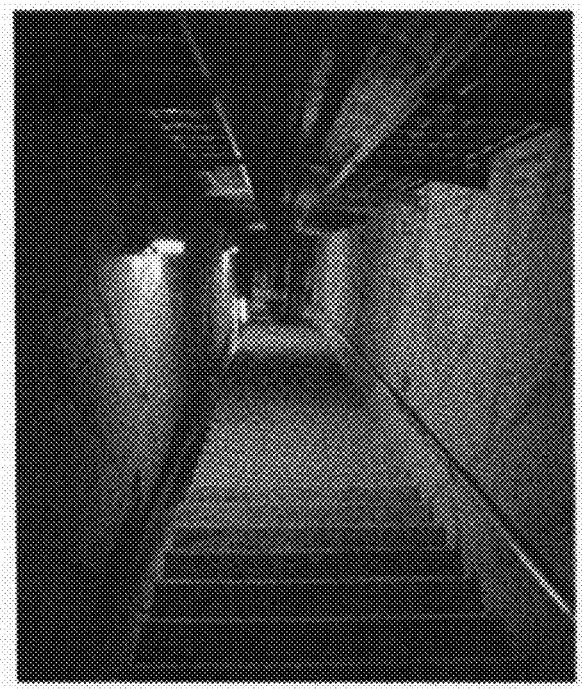
FIGS. 9A to 10B are views showing experimental results according to an embodiment of the invention.
Figure 9B:
Figure 10A:
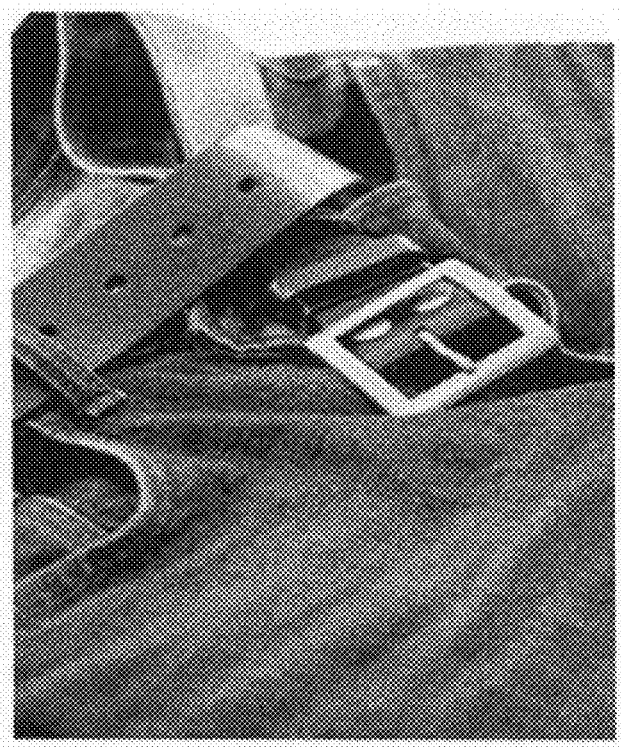
Figure 10B:
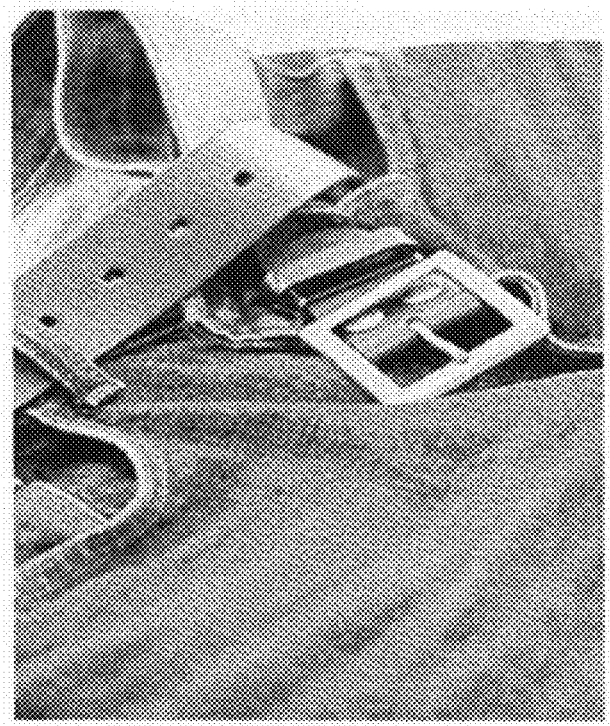

FIGS. 9A to 10B are views showing experimental results according to an embodiment of the invention. FIGS. 9A and 10A show input raw images and FIGS. 9B and 10B show compensated images whose local contrasts have been increased according to an embodiment of the invention.

That is, when the user views an image as shown in FIG. 9A or 10A through a personal portable terminal under a high illuminance environment, actually, the visibility of the image is reduced due to the high external illuminance and thus the user cannot view the image. However, the personal portable terminal outputs on a display screen an image compensated by the LUT and the local contrast compensation according to the above-mentioned embodiment of the invention, as shown in FIG. 9B or 10B. Due to the external illuminance, the user can view the image as shown in FIG. 9A or 10A, not the compensated image as shown in FIG. 9B or 10B. Therefore, the local contrast compensation makes it possible to ensure the visibility of the input image and for a user to see the detailed portions of the image.

Although aspects of the present invention have been described in connection with the exemplary embodiments of the present invention, it will be apparent to those skilled in the art that various modifications and changes may be made thereto without departing from the scope and spirit of the invention. Therefore, it should be understood that the above embodiments are not limitative, but illustrative in all aspects.

As described above, according to aspects of the present invention, the local contrast compensation makes it possible to ensure the visibility of an image such that the distortion of the image is not perceived even under a high illuminance environment.

What is claimed is:

1. An apparatus for improving visibility of an image, the apparatus comprising:
    a LUT (lookup table) generating module to generate, using one or more processors, a LUT having image data in a high illuminance environment corresponding to image data of an input image set therein so as to increase lightness and chroma of the input image according to external illuminance;
    an image mapping module to map the image data of the input image into the image data in the high illuminance environment according to the generated LUT; and
    a local contrast increasing module to increase a local contrast of the mapped image data using a parameter for adjusting the local contrast according to the external illuminance,
    wherein the local contrast increasing module comprises:
    a lightness computing module to compute the lightness of the input image and a lightness of the image into which the input image has been mapped by the image mapping module;
    a low pass filter to filter luminance data of each of pixels constituting the input image and luminance data of each of pixels constituting the image into which the input image has been mapped;
    an index computing module to compute a contrast ratio index and a contrast index with respect to the input image according to the filtered luminance data and average luminance data with respect to all of the pixels constituting the input image; and
    a local contrast module to increase a local contrast of a pixel region corresponding to the parameter according to the contrast index and the contrast ratio index.

2. The apparatus of claim 1, wherein the parameter is data corresponding to a duration of sensed illuminance.

3. The apparatus of claim 1, wherein, when image data corresponding to RGB image data of an arbitrary pixel of the input image is not set in the generated LUT, the image mapping module interpolates adjacent image data and maps the interpolated image data.

4. The apparatus of claim 1, wherein:
    the contrast index is determined by an equation:

$$\text{contrast\_index} = \frac{Y\_\text{mean} - Y\_\text{pixel}}{Y\_\text{mean} + Y\_\text{pixel}},$$

where Y_mean represents an average value of luminances of all of the pixels constituting the input image and Y'_pixel represents a luminance of each of the pixels constituting the image into which the input image has been mapped.

5. The apparatus of claim 1, wherein:
    the contrast ratio index is determined by an equation:

$$\text{contrast\_ratio\_index} = \frac{Y\_\text{pixel\_fitered}}{Y\_\text{pixel}} \text{ or,}$$

$$\text{contrast\_ratio\_index} = \frac{Y'\_\text{pixel\_filtered}}{Y'\_\text{pixel}},$$

where Y_pixel represents a luminance of each of the pixels constituting the input image, Y_mean represents an average value of luminances of all of the pixels constituting the input image, Y_pixel_filtered represents a filtered Y_pixel, Y'_pixel represents a luminance of each of the pixels constituting the image into which the input image has been mapped, and Y'_pixel_filtered represents a filtered Y'_pixel.

6. The apparatus of claim 1, wherein the local contrast compensating module determines whether the corresponding pixel region is a dark region or a light region according to the contrast index.

7. The apparatus of claim 6, wherein, when determined that the corresponding pixel region is the dark region, the local contrast compensating module decreases a luminance of the corresponding pixel region using the parameter.

8. The apparatus of claim 6, wherein:
when determined that the corresponding pixel region is the light region, the local contrast compensating module determines whether to increase the local contrast of the corresponding pixel region according to the contrast ratio index, and
when it is determined that the local contrast of the corresponding region needs to be increased, the local contrast compensating module increases a luminance of the corresponding region using the parameter.

9. A method of improving visibility of an image, the method comprising:
generating a LUT (lookup table) having image data in a high illuminance environment corresponding to image data of an input image set therein so as to increase lightness and chroma of the input image according to external illuminance;
mapping the image data of the input image into the image data in the high illuminance environment according to the generated LUT; and
increasing a local contrast of the mapped image data using a parameter for adjusting the local contrast according to the external illuminance,
wherein the increasing of the local contrast comprises:
computing the lightness of the input image and a lightness of the image into which the input image has been mapped in the mapping of the image data;
filtering luminance data of each of pixels constituting the input image and luminance data of each of pixels constituting the image into which the input image has been mapped;
computing a contrast ratio index and a contrast index with respect to the input image according to the filtered luminance data and average luminance data with respect to all of the pixels constituting the input image; and
increasing a local contrast of a pixel region corresponding to the parameter according to the contrast index and the contrast ratio index.

10. The method of claim 9, wherein the parameter is data corresponding to a duration of sensed illuminance.

11. The method of claim 9, wherein, when image data corresponding to RGB image data of an arbitrary pixel of the input image is not set in the generated LUT, the mapping of the image data comprises interpolating adjacent image data and mapping the interpolated image data.

12. The method of claim 9, wherein:
the contrast index is determined by an equation:

$$\text{contrast\_index} = \frac{Y\_mean - Y\_pixel}{Y\_mean + Y\_pixel},$$

where Y_mean represents an average value of luminances of all of the pixels constituting the input image and Y'_pixel represents a luminance of each of the pixels constituting the image into which the input image has been mapped.

13. The method of claim 9, wherein:
the contrast ratio index is determined by an equation:

$$\text{contrast\_ratio\_index} = \frac{Y\_pixel\_fitered}{Y\_pixel} \text{ or,}$$

$$\text{contrast\_ratio\_index} = \frac{Y'\_pixel\_filtered}{Y'\_pixel},$$

where Y_pixel represents a luminance of each of the pixels constituting the input image, Y_mean represents an average value of luminances of all of the pixels constituting the input image, Y_pixel_filtered represents a filtered Y_pixel, Y'_pixel represents a luminance of each of the pixels constituting the image into which the input image has been mapped, and Y'_pixel_filtered represents a filtered Y'_pixel.

14. The method of claim 9, wherein the increasing of the local contrast comprises determining whether the corresponding pixel region is a dark region or a light region according to the contrast index.

15. The method of claim 14, wherein, when it is determined that the corresponding pixel region is the dark region, the increasing of the local contrast further comprises decreasing a luminance of the corresponding pixel region using the parameter.

16. The method of claim 14, wherein:
when determined that the corresponding pixel region is the light region, the increasing of the local contrast further comprises:
determining whether to increase the local contrast of the corresponding pixel region according to the contrast ratio index; and
increasing a luminance of the corresponding region using the parameter when it is determined that the local contrast of the corresponding region needs to be increased.

* * * * *

UNITED STATES PATENT AND TRADEMARK OFFICE
CERTIFICATE OF CORRECTION

PATENT NO. : 8,041,144 B2
APPLICATION NO. : 11/873042
DATED : October 18, 2011
INVENTOR(S) : In-Ji Kim et al.

Page 1 of 1

It is certified that error appears in the above-identified patent and that said Letters Patent is hereby corrected as shown below:

Column 8, Line 50, In Claim 5, delete "Y_pixel_fitered" and insert -- Y_pixel_filtered --, therefor.

Column 10, Line 17 (Approx.), In Claim 13, delete "Y_pixel_fitered" and insert -- Y_pixel_filtered --, therefor.

Signed and Sealed this
Fourteenth Day of February, 2012

David J. Kappos
*Director of the United States Patent and Trademark Office*